Dec. 20, 1955  G. BOSSO  2,727,270
WINDSCREEN WIPER
Filed Feb. 12, 1952
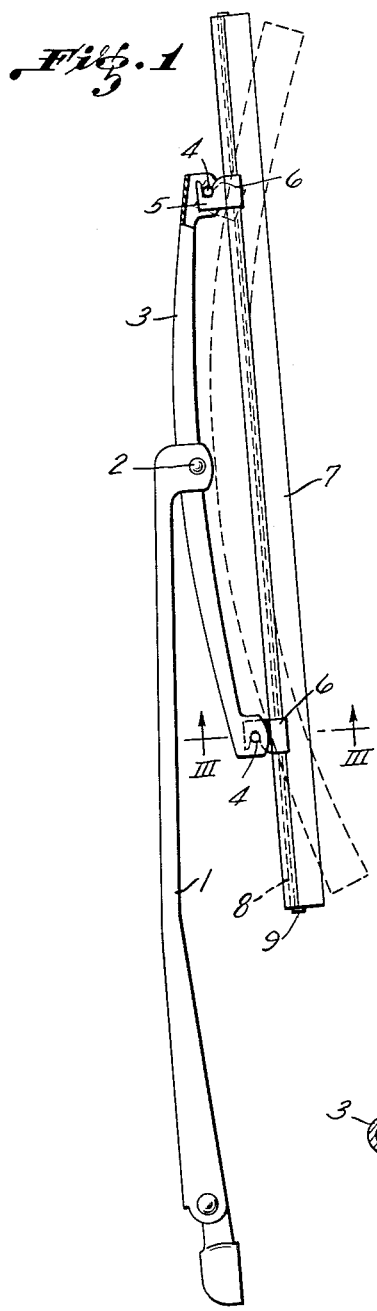
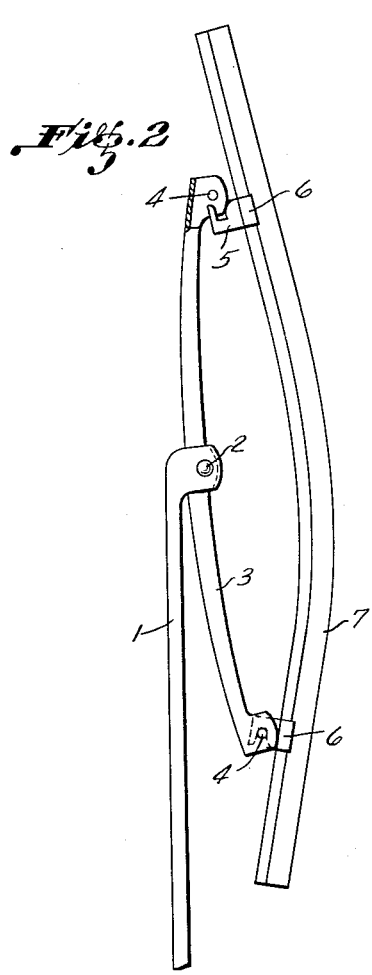
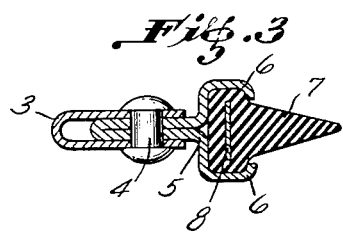
INVENTOR
GIACOMO BOSSO
BY Robert E. Burns
ATTORNEY United States Patent Office 2,727,270
Patented Dec. 20, 1955

2,727,270

WINDSCREEN WIPER

Giacomo Bosso, Turin, Italy, assignor to Fiat S. p. A., Turin, Italy

Application February 12, 1952, Serial No. 271,220

Claims priority, application Italy February 14, 1951

1 Claim. (Cl. 15—245)

This invention relates to wipers for curved motor vehicle windscreens and is intended to meet in a simple and inexpensive manner the requirements of this type of windscreen wipers.

The windscreen wiper according to this invention comprises a wiper blade formed by a rubber shape incorporating a flexible metal strip of which the flat surface is turned towards the windscreen, the wiper blade being provided with two hooks engaged, by virtue of the elasticity of the blade due to the provision of the metal strip, by pins carried by the end of a beam hinged centrally to the arm actuating the wiper blade.

The resilient strip incorporated by or fitted into the wiper blade performs a double function, namely, it confers to the wiper blade a transverse stiffness sufficient for resisting the frictional stress on the windscreen and solves in a simple and inexpensive manner the problem of engaging and releasing the wiper blade.

The invention shall be described with reference to the accompanying drawing which shows by way of example, a construction thereof.

Figure 1 is an elevation of the windscreen wiper in its operative position.

Figure 2 shows the windscreen wiper in the position in which the wiper blade is deformed on release from the beam.

Figure 3 is a section on line III—III of Figure 1.

1 denotes the oscillating arm driving the wiper and having hinged to one end about a pivot 2 a U-shaped beam 3. The beam is provided at its ends with two pins 4 engaging two hooks 5 formed in sheet metal plates encircling by their bent edges 6 the wiper blade 7 made of a rubber strip. The blade incorporates a resilient strip 8 arranged with its flat portion turned towards the windscreen and retained at its ends by two bends 9.

By virtue of the resiliency of the metal strip 8 the wiper blade 7 is free to constantly suit the variable curvature of the windscreen, as shown in Figure 1, though affording a sufficient adherence to the windscreen.

The wiper blade is engaged and released, as shown in Figure 2 by deforming it till one of the two hooks is released from its pin.

What I claim is:

In a windshield wiper for windshields having a curved surface, the combination of a wiper blade having a windshield engaging forward side and a leaf spring embedded in said blade adjacent its rear side, and a blade supporting beam releasably connected to said blade, said beam being connected to said blade by connecting means comprising two spaced-apart pins each carried at opposite ends of said beam and complementary spaced-apart hooks secured adjacent the ends of said blade, said hooks comprising clamp means embracing said blade to enclose said spring leaf, and rearwardly extending hook portions having an opening facing the adjacent end of the blade for receiving and embracing a pin carried by said beam in the direction of said adjacent end of the blade, whereby said blade may be disengaged from said beam by flexing the center of said blade in a direction away from said beam but is free for flexing movement from a rectilinear position rearwardly toward said beam while being restrained from disengagement.

References Cited in the file of this patent

UNITED STATES PATENTS

| | | |
|---|---|---|
| 1,953,635 | Rose et al. | Apr. 3, 1934 |
| 2,596,063 | Anderson | May 6, 1952 |

FOREIGN PATENTS

| | | |
|---|---|---|
| 615,364 | Great Britain | of 1948 |
| 619,320 | Great Britain | of 1949 |
| 958,708 | Great Britain | of 1949 |